Jan. 26, 1926.
H. J. LEIGHTON
1,571,015
FRICTION CLUTCH FOR MOTOR VEHICLES
Filed May 7, 1921
2 Sheets-Sheet 1
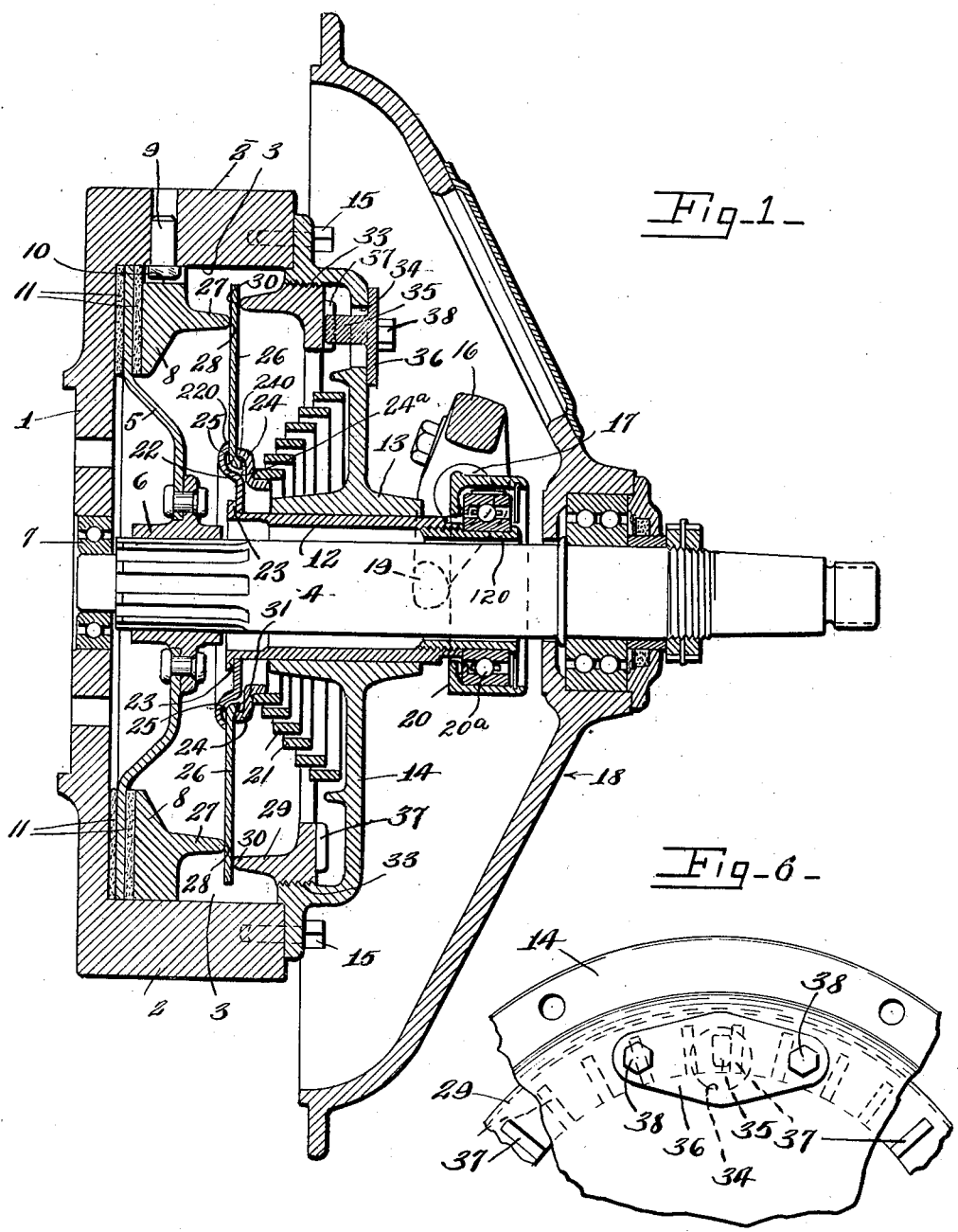

Jan. 26, 1926.
H. J. LEIGHTON
1,571,015
FRICTION CLUTCH FOR MOTOR VEHICLES
Filed May 7, 1921    2 Sheets-Sheet 2
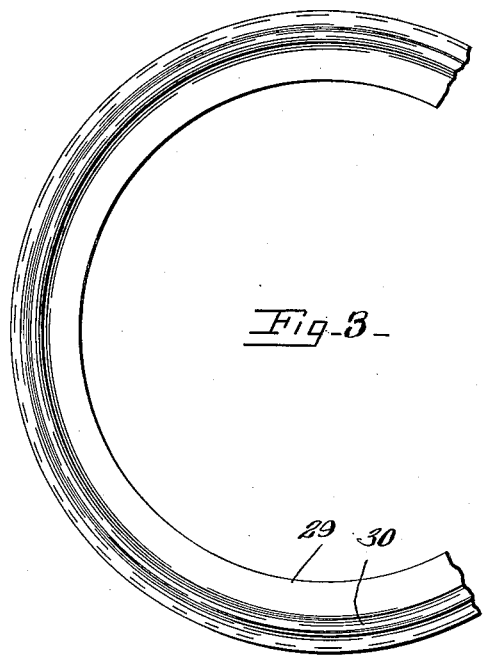
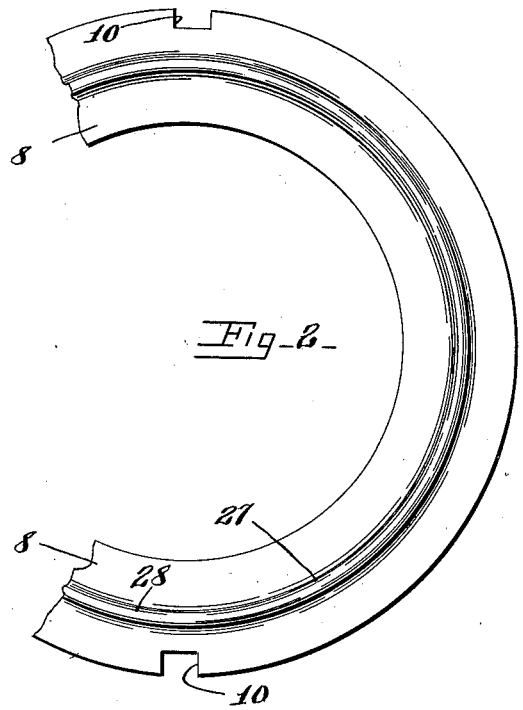
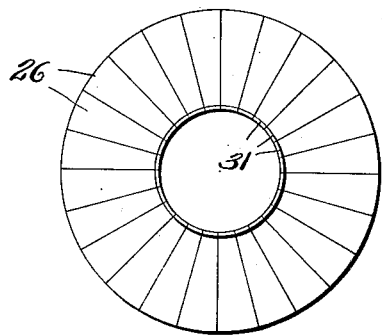
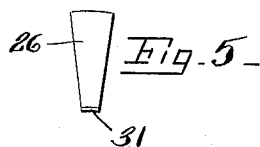
Herbert J Leighton    INVENTOR.
BY
Parsons & Badell    ATTORNEYS.

Patented Jan. 26, 1926.

1,571,015

UNITED STATES PATENT OFFICE.

HERBERT J. LEIGHTON, OF SYRACUSE, NEW YORK, ASSIGNOR TO BROWN-LIPE GEAR COMPANY, OF SYRACUSE, NEW YORK, A CORPORATION OF NEW YORK.

FRICTION CLUTCH FOR MOTOR VEHICLES.

Application filed May 7, 1921. Serial No. 467,553.

*To all whom it may concern:*

Be it known that I, HERBERT J. LEIGHTON, a citizen of the United States, and a resident of Syracuse, in the county of Onondaga and State of New York, have invented a certain new and useful Friction Clutch for Motor Vehicles, of which the following is a specification.

This invention relates to clutches of the type used in motor vehicles and has for its object a particularly simple, compact, durable, economical and efficient construction for transmitting and applying the motion of the clutch operating member to the pressure member or ring of the clutch.

The invention consists in the novel features and in the combinations and constructions hereinafter set forth and claimed.

In describing this invention, reference is had to the accompanying drawings in which like characters designate corresponding parts in all the views.

Figure 1 is a sectional view taken centrally of one form of clutch embodying my invention.

Figures 2 and 3 are fragmentary face views, respectively, of the pressure member or ring and the fulcrum ring for the intermediate motion transmitting levers.

Figure 4 is a detached view on a reduced scale, of one form and arrangement of the motion transmitting levers.

Figure 5 is a detail view of one of said levers.

Figure 6 is a fragmentary end elevation of the cover plate of the clutch, showing the locking plate for holding the fulcrum ring in its adjusted position.

This clutch comprises generally, driving and driven elements, a pressure member or ring rotatable with, and shiftable axially of, one of the said elements, the other of said elements comprising a friction plate extending between the pressure ring and the opposing surface of the element with which the pressure ring is associated and a shaft carrying the friction plate, an operating member shiftable axially of the shaft, and motion transmitting means between the operating member and the pressure ring arranged and operating to apply the pressure to the pressure ring at a multiplicity of points so close together that the pressure is applied substantially equally throughout the entire circle of the pressure ring.

In so far as this invention is concerned, the driving and driven elements and associated parts, the pressure ring and its connection to the element with which it is associated, and the operating member and associated parts, may be of any suitable form, size and construction, and in the illustrated embodiment of this invention, the pressure ring is associated with the driving element and the friction plate with the driven element.

1 designates the driving element which is here shown as discoidal in general form and as having an annular flange 2 which encloses a cylindrical recess 3. This driving element is usually the fly wheel of an engine.

4 designates the shaft of the driven element, and 5 a friction plate carried by a hub 6 secured to the shaft 4 to rotate therewith and slide axially thereof in any suitable manner. The shaft 4 is arranged substantially coaxially with the driving element 1 and may have a pilot bearing 7 in the driving element 1.

8 designates the pressure ring located in the recess 3 and secured to the driving element to rotate therewith and slide axially thereof. As here illustrated, the pressure ring slidably fits the annular wall of the recess 3, and in the illustrated clutch construction, is connected to the flange 2 by means of keys or pins as 9 arranged in the flange 2 and projecting into grooves or keyways 10 formed in the periphery of the ring 8.

The friction plate 5 of the driven element extends between the ring 8 and the opposing surface of the driving element 1 and preferably friction plates or disks 11 are arranged on opposite sides of the plate 5.

12 is the operating member encircling the shaft 4 and slidable axially thereof, it being here shown as a tube or sleeve slidable in the bearing or hub 13 of a cover plate 14 secured to the rear edge of the flange 2 of the driving element in any suitable manner as by screws 15. The operating member is controlled by means of a suitable yoke 16 mounted upon a shaft 17 journalled in the casing 18 of the clutch, the yoke having shoulders 19 which thrust against a collar 20 provided on the rear end of the operating element or sleeve 12. The yoke is operated by the usual lever or pedal. An antifriction bearing 20ª is preferably interposed between the collar 20 and a reduced outer or rear end of the sleeve 12, the reduced end being here shown as a sleeve member 120 threading into the outer end of the main part or section of the sleeve 12.

21 is a spring here illustrated as interposed between the plate 14 and the operating member 12 and normally tending to hold the clutch engaged; and as here illustrated, the sleeve 12 is formed with a spring abutment consisting of a discoidal member 22 at the inner end of the operating member or sleeve 12 and abutting against a shoulder 23 at the inner end of the sleeve 12 and a second discoidal member 24 opposed to the member 22 and constituting a seat for the inner end of the spring 21. These two members 22 and 24 are spaced apart at 24ª to permit axial relative movement thereof and are shaped to form an annular channel 25.

The motion transmitting means between the operating member 12 and the pressure ring 8 for applying the pressure of the spring 21 to the ring 8 substantially equally throughout the circle of the ring 8 comprises a plurality of levers 26 coacting at their inner ends with the member 12 and at their outer ends at spaced apart points in radial directions with a fulcrum associated with the driving element 1 and an annular face associated with the ring 8, these levers preferably abutting against each other at their side edges and hence being held by each other from lateral displacement. Preferably, these levers are segments of a discoidal plate as seen in Fig. 4, and may be rigid or more or less flexible and resilient.

As illustrated, in Figs. 1 and 2, the pressure ring 8 is provided with a rearwardly projecting annular flange 27 having at its edge an annular bearing face 28 against which the front sides of the levers 26 press, and the driving element is provided with a fulcrum member 29 located at the rear side of the levers 26, the fulcrum member 29 having a forwardly projecting annular flange terminating in an annular fulcrum 30 arranged to engage the rear sides of the levers 26 radially outwardly relatively to the bearing face 28 of the ring 8 whereby the levers are of the second class. The inner ends of the levers extend into the annular channel 25 before mentioned, as associated with the operating member 12, and are formed with hook-shaped flanges at 31 to interlock in such channel. Usually the outer edge 220 of the discoidal member 22 which forms the inner or left side of the channel 25 is located farther outward radially from the axis of rotation of the clutch than the opposing edge 240 of the discoidal member 24 so that the outer annular edges of these members 22, 24 engage the levers on the inner and outer sides thereof at points out of alignment. Hence when the levers are under the pressure of the spring 21, the discoidal member which is resilient, is tensioned, and when the clutch is released by depressing the pedal, not shown, connected to the shaft 17, the resilient member 22 reacts, on the inner ends of the levers, and withdraws them quickly out of their operative positions.

The fulcrum member 29 as here shown threads into the plate 14 at 33 and is adjustable through a suitable hole 34 in the plate to vary the starting positions of the levers 26 and to take up undue looseness and wear. The fulcrum member 29 is held in its adjusted position by a lug 35 formed on the locking plate 36 which closes the hole 34. This lug 35 is engaged with one of a plurality of lugs 37 on the outer face of the fulcrum member 29. The plate 36 is here shown as held in position by screws 38. The plate 14 forms an oil tight cover for the clutch. The oil if used is poured into the clutch through the hole 34.

Owing to the construction and arrangement of the levers 26, the levers can be mounted in position without the use of pivot bearings thereby simplifying the construction of the levers, the pressure ring and fulcrum and the assembly thereof, and making the clutch more economical in manufacture than heretofore. Furthermore, the efficiency of the clutch is increased as the levers apply the pressure to the pressure ring and the fulcrum substantially equally throughout the entire circles of the ring and the fulcrum. Although owing to the arcs of the bearing faces of the pressure ring and the fulcrum member and the flat faces of the levers, the levers may not engage such bearing faces in a continuous line during the movement of the levers, nevertheless, the points at which the levers do engage said bearing faces are so numerous and close together that the pressure of the levers is applied to said bearing faces substantially or practically equally throughout the circles of said faces. Hence, the pressure ring can be made much lighter than heretofore for obviously, the equal application of pressure is not dependent on the rigidity of the pressure ring.

What I claim is:

1. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and an operating member shiftable axially of the shaft; of an annular fulcrum carried by and rotatable with the element with which the pressure ring is associated, the annular fulcrum being adjustable axially of said element, and motion transmitting means between said operating member and the ring, said means comprising levers for moving the pressure ring, the levers engaging said annular fulcrum substantially throughout the entire circle thereof, substantially as and for the purpose described.

2. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and an operating member shiftable axially of the shaft; of an annular bearing face on the rear side of the ring, an annular fulcrum carried by the element with which the ring is associated and adjustable axially toward the annular bearing face, and motion transmitting means between said member and the ring, comprising levers engaging the bearing face and the fulcrum substantially throughout the entire circles of such face and fulcrum, substantially as and for the purpose set forth.

3. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and an operating member shiftable axially of the shaft; of motion transmitting means between said member and the ring for moving the ring, said means comprising a series of levers arranged side by side and abutting against each other at their side edges the levers being held with their side edges in alinement by the pressure ring and the opposing surface of the element with which the pressure ring is rotatable, substantially as and for the purpose described.

4. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and an operating member shiftable axially of the shaft, of motion transmitting means between said member and the ring for moving the ring, said means comprising a series of yielding levers arranged side by side, said levers being segments of a discoidal plate and coacting at their inner ends with said member and near their outer ends at spaced apart points with the pressure ring and the element with which said ring is associated, substantially as and for the purpose specified.

5. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and an operating member shiftable axially of the shaft, of motion transmitting means between said member and the ring for moving the ring, said means comprising a series of yielding levers arranged side by side and abutting against each other at their side edges the levers being held with their side edges in alinement by the pressure ring and the opposing surface of the element with which the pressure ring is rotatable, said levers being segments of a discoidal plate and coacting at their inner ends with said member and near their outer ends at spaced apart points with the pressure ring and the element with which said ring is associated, substantially as and for the purpose specified.

6. In a clutch, the combination with driving and driven elements, a pressure ring rotatable with and shiftable axially of one of said elements, the other of said elements including a shaft and a friction plate rotatable with the shaft and extending between the pressure ring and the opposing surface of the element with which the ring is associated, and an operating member shiftable axially of the shaft; of an annular bearing face provided on the rear side of the ring an annular fulcrum carried by the element with which the ring is associated the annular fulcrum being adjustable axially of said element and yielding motion transmitting levers between the operating member and the ring, said levers coacting at their inner ends with said operating member and at their outer ends with the bearing face and the fulcrum and said levers being arranged relatively to each other to coact with the annular bearing face and the annular fulcrum throughout the major portion of the circles of said bearing face and fulcrum.

7. In a clutch, the combination with driving and driven elements, a pressure ring rotatable with and shiftable axially of one of said elements, the other of said elements including a shaft and a friction plate rotatable with the shaft and extending between the pressure ring and the opposing surface of the element with which the ring is associated, an operating member shiftable axially of the shaft, and a spring tending to shift said member in one direction; of a spring abutment associated with the operating member and comprising resilient members spaced apart, a fulcrum member carried by the element with which the ring is associated, and motion transmitting levers between the operating member and the ring, said levers coacting with the fulcrum member and extending between the abutment members, said abutment members engaging the levers on opposite sides of such levers, and one engaging like sides of the levers nearer the inner end of the lever than the other abutment member engages the opposite sides of the levers, substantially as and for the purpose set forth.

In testimony whereof, I have hereunto signed my name, at Syracuse, in the county of Onondaga and State of New York, this 30th day of April, 1921.

HERBERT J. LEIGHTON.